Patented May 24, 1932

1,860,286

UNITED STATES PATENT OFFICE

MAX HARTMANN AND HANS ISLER, OF RIEHEN, NEAR BASEL, SWITZERLAND, ASSIGNORS TO FIRM OF SOCIETY OF CHEMICAL INDUSTRY IN BASLE, OF BASEL, SWITZERLAND

BASIC ETHERS OF ARYL-QUINOLINES

No Drawing. Application filed May 10, 1930, Serial No. 451,505, and in Switzerland May 16, 1929.

The present invention relates to new basic ethers of aryl-quinolines useful in therapeutics.

The new compounds are obtained by causing to react, preferably in presence of an agent that binds acid, an amino-alkylating agent on an hydroxy-aryl-quinoline or a substitution product thereof; or an amino-alcohol on a halogen-aryl-quinoline or a substitution product thereof; or an amine on a halogen-alkoxy-aryl-quinoline or a substitution product thereof; or by converting a basic ether of an aromatic compound by ring closure into a basic ether of an aryl-quinoline.

As the ring closure reaction there may be cited as an example the transformation of a basic ether of an aromatic amine by means of an aldehyde and pyroracemic acid or by means of benzoyl acetone.

The new bases form with acids salts soluble in water. Because of their high antipyretic action they are applicable as therapeutic agents.

The following examples illustrate the invention, the parts being by weight:—

Example 1

A mixture of 1 part of 2-phenyl-7-hydroxyquinoline, 1.5 part of chlorethyldiethylamine hydrochloride, 3 parts of potassium carbonate and 30 parts of acetone is boiled for several hours. After filtration the acetone is distilled from the filtrate and the residue is taken up with ether. The ethereal solution is shaken with dilute caustic alkali solution and evaporated to dryness. The 2-phenyl-7-diethylaminoethoxy-quinoline remains in the form of a yellow oil. It is sparingly soluble in water but freely soluble in organic solvents, as well as in acids. Its dihydrochloride forms a bright yellow crystalline powder of melting point 230–231° C. and its monohydrochloride white crystals of melting point 155–157° C., both soluble in water.

The same base can be obtained by the action of 2-phenyl-7-bromethoxy-quinoline on diethylamine at a raised temperature. The 2-phenyl-7-bromethoxy-quinoline can be made by boiling an alcoholic solution of ethylene bromide containing 2-phenyl-7-hydroxy-quinoline in presence of an alkali; it forms a yellowish crystalline powder of melting point 112–113° C.

Example 2

1 part of sodium is dissolved in 30 parts of diethylamino-ethanol and the solution is heated for some time in an oil bath with 8 parts of 2-chloro-3-phenyl-quinoline (melting point 54–55° C.; obtainable from 3-phenyl-carbostyril by boiling this with phosphorous oxychloride). The mass is extracted with ether and the sodium chloride which has been formed is separated by filtration and the solvent is distilled from the filtrate together with the excess of diethylamino-ethanol. There remains the 2-diethylamino-ethoxy-3-phenyl-quinoline in the form of a bright yellow oil, freely soluble in organic solvents and in acids but sparingly soluble in water. Its monohydrochloride melts at 150–151° C.

Example 3

2.5 parts of 2-(para-hydroxy-phenyl)-quinoline, 2.4 parts of chlorethyldiethylamine-hydrochloride and 1 part of sodium hydroxide are stirred together in aqueous solution for several hours at a slightly raised temperature. The base which separates is dissolved in ether and the solution is washed with water. After distilling the ether there remains the 2-(para-diethylaminoethoxyphenyl)-quinoline in the form of a nearly colorless oil which dissolves sparingly in water but very freely in organic solvents and in acids. Its monohydrochloride is a colorless crystalline powder of melting point 209–210° C.

Example 4

2 parts of para-piperidyl-ethoxyaniline-hydrochloride (obtainable by saponifying the piperidylethylether of para-acetaminophenol), 1 part of benzaldehyde and 30 parts of alcohol are heated together to boiling. Into the boiling solution is introduced, drop by drop, a solution of 1 part of pyroracemic acid in 10 parts of alcohol, the whole is then boiled for some hours, the alcohol is then distilled and water is added to the residue. There then separates the sparingly soluble hydrochloride of 2-phenyl-6-piperidyl-ethoxy-4-quinolinecarboxylic acid, containing water, in the form of small canary-yellow needles. By heating these in a vacuum the water of crystallization is lost and the body becomes colorless. In order to obtain the free amino-acid the hydrochloride is dissolved in water and the solution is neutralized cautiously with alkali solution. The acid which separates forms colorless crystals and melts when recrystallized from alcohol at 220–221° C. It is sparingly soluble in water and freely soluble in aqueous alkali.

*Example 5*

1 part of sodium is dissolved in 40 parts of alcohol and the solution is heated for several hours with 8 parts of 2-phenyl-7-hydroxy-quinoline and 7 parts of α-diethyl-amino-γ-chloro-pentane (colorless oil of boiling points 68–69° C. at 5 mm. pressure; the hydrochloride of this base, of melting point 90–92° C., may be obtained by causing thionylchloride to react with α-ethyl-δ-diethylaminopropyl-alcohol). After filtration the alcohol is distilled from the filtrate and the residue is taken up with ether. The ethereal solution is evaporated. The 2-phenyl-7-(α-ethyl-γ-diethylaminopropylhydroxy)-quinoline of the formula

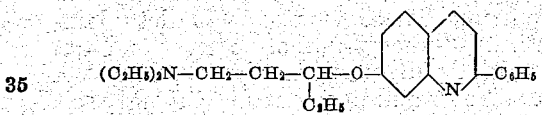

remains as a yellow, viscous oil of boiling point 217–218° C. at 0,1 mm. pressure.

In similar manner the following compounds can be made:—

2-phenyl-6-diethylaminoethoxy-quinoline. Bright yellow oil; its dihydrochloride melts at 211–212° C.

2-phenyl-7-di-n-butylaminoethoxy-quinoline.

Bright yellow oil; melting point of the white monohydrochloride 89–90° C. and of the yellowish dihydrochloride 133–134° C.

4-phenyl-7-diethylaminoethoxy-quinaldine.

Colorless oil; its colorless dihydrochloride melts at 250–251° C.

4-phenyl-7-dicyclohexylamino-ethoxy-quinaldine.

Colorless crystals of melting point 104–105° C.

Its colorless dihydrochloride decomposes at 110° C.

2:4-di(diethylaminoethoxy)-3-phenyl-quinoline.

Yellowish oil of boiling point 208–210° C. at 4 mm. pressure.

The 2:4-dichloro-3-phenylquinoline necessary for making the last-named compound is obtainable by boiling 2:4-dihydroxy-3-phenyl-quinoline with phosphorus oxy-chloride; it melts at 94° C.

What we claim is:—

1. As new products basic ethers of phenyl-quinolines of the general formula

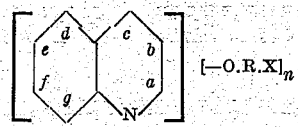

wherein R represents an alkylene radical containing at least two carbon atoms, X a tertiary amine, and n the numbers 1 or 2, and wherein one of the carbon atoms a, b or c is linked with phenyl, and the group O.R.X is linked with one or two of the not yet substituted carbon atoms a and c, or with one of the carbon atoms e and f, or with the phenyl group, which products form with acids neutral salts and are useful in therapeutics.

2. As new products basic ethers of phenyl-quinolines of the general formula

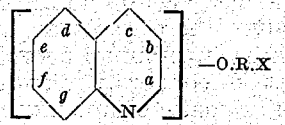

wherein R represents an alkylene radical containing at least two carbon atoms and X a tertiary amine, and wherein one of the carbon atoms a, b or c is linked with phenyl, and the group O.R.X is linked with one of the not yet substituted carbon atoms a or c, or with one of the carbon atoms e and f, or with the phenyl group, which products form with acids neutral salts and are useful in therapeutics.

3. As new products basic ethers of 2-phenyl-quinolines of the general formula

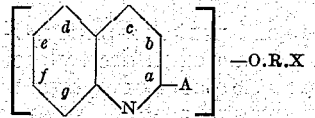

wherein R represents an alkylene chain containing at least two carbon atoms, X a tertiary amine, and A a phenyl group, and wherein the group O.R.X is linked with one of the carbon atoms c, e or f or with A, which products form with acids neutral salts and are useful in therapeutics.

4. As new products basic ethers of 2-phenyl-quinolines of the general formula

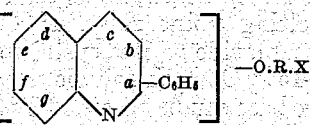

wherein R represents an alkylene chain containing at least two carbon atoms and X a tertiary amine, and wherein the group O.R.X is linked with one of the carbon atoms c, e or f, which products form with acids neutral salts and are useful in therapeutics.

5. As new products basic ethers of 2-phenyl-quinolines of the general formula

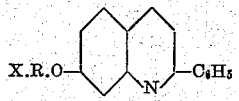

R representing an alkylene chain containing at least two carbon atoms, and X a tertiary amine, which products form with acids neutral salts and are useful in therapeutics.

6. As new products basic ethers of 2-phenyl-quinolines of the general formula

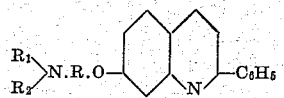

$R_1$ and $R_2$ meaning monovalent alkyl groups and R an alkylene chain containing at least two carbon atoms, which products form with acids neutral salts and are useful in therapeutics.

7. As new products basic ethers of 2-phenyl-quinolines of the general formula

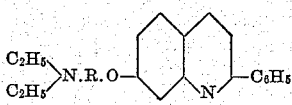

R meaning an alkylene chain containing at least two carbon atoms, which products form with acids neutral salts and are useful in therapeutics.

8. As a new product 2-phenyl-7-diethyl-aminoethoxy-quinoline of the formula

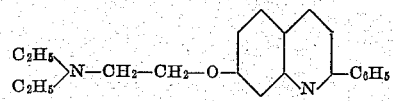

which is a yellow oil, sparingly soluble in water, but freely soluble in organic solvents, and forming a white monohydrochloride of melting point 155–157° C. and a yellowish dihydrochloride of melting point 230–231° C., both soluble in water, said product being useful in therapeutics.

In witness whereof we have hereunto signed our names this 29th day of April, 1930.

MAX HARTMANN.
HANS ISLER.